(12) United States Patent
Rajaa et al.

(10) Patent No.: US 11,403,181 B2
(45) Date of Patent: *Aug. 2, 2022

(54) SYSTEMS AND METHODS FOR MANAGING REPLICATION OF DATA TO A REMOTE STORAGE DEVICE

(71) Applicant: Veritas Technologies LLC, Santa Clara, CA (US)

(72) Inventors: Subash Rajaa, Pune (IN); Sunil Hasbe, Shirur Anantpal (IN); Anish Vaidya, Pleasanton, CA (US); Om Prakash Agarwal, Fremont, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/778,462

(22) Filed: Jan. 31, 2020

(65) Prior Publication Data

US 2020/0167239 A1 May 28, 2020

Related U.S. Application Data

(63) Continuation of application No. 15/719,490, filed on Sep. 28, 2017, now Pat. No. 10,565,062.

(30) Foreign Application Priority Data

Aug. 3, 2017 (IN) .............................. 201721027617

(51) Int. Cl.
G06F 11/14 (2006.01)

(52) U.S. Cl.
CPC ...... *G06F 11/1451* (2013.01); *G06F 11/1464* (2013.01); *G06F 2201/805* (2013.01); *G06F 2201/82* (2013.01)

(58) Field of Classification Search
CPC ... G06F 11/14; G06F 11/1451; G06F 11/1464
See application file for complete search history.

(56) References Cited

U.S. PATENT DOCUMENTS 6,732,124 B1 * 5/2004 Koseki ................ G06F 11/1435
7,246,200 B1 * 7/2007 van Rietschote ..... G06F 9/4403
709/220

(Continued)

*Primary Examiner* — Kamini B Patel
(74) *Attorney, Agent, or Firm* — FisherBroyles, LLP (57) ABSTRACT

The disclosed computer-implemented method for managing replication of data to a remote storage device may include (1) maintaining a first bitmap and a second bitmap storing data acknowledging persistence of target data, respectively, at source and target gateways, where the target gateway serves the remote storage device, (2) sending replication data from a computing device to the source gateway, (3) setting a bit in the first bitmap, where the set bit corresponds to the replication data sent to the source gateway, (4) receiving a first acknowledgement indicating the source gateway received the replication data, (5) copying, in response to the first acknowledgement, the bit to the second bitmap, (6) clearing, in response to the first acknowledgement, the bit in the first bitmap, and (7) receiving a second acknowledgement indicating the target gateway received the replication data. Various other methods, systems, and computer-readable media are also disclosed.

20 Claims, 3 Drawing Sheets

(56) References Cited

U.S. PATENT DOCUMENTS

| | | | | |
|---|---|---|---|---|
| 7,581,247 | B2* | 8/2009 | Sultan | H04L 29/12009 709/219 |
| 9,836,515 | B1* | 12/2017 | Nayak | G06F 11/2082 |
| 10,565,062 | B1* | 2/2020 | Rajaa | G06F 11/1451 |
| 2003/0033327 | A1* | 2/2003 | Mandal | G06F 16/27 |
| 2003/0204557 | A1* | 10/2003 | Mandal | G06F 11/2074 709/202 |
| 2004/0098417 | A1* | 5/2004 | Nishikawa | G06F 11/2069 |
| 2006/0020754 | A1* | 1/2006 | Suzuki | G06F 11/2064 711/114 |
| 2006/0053304 | A1* | 3/2006 | Fries | G06F 11/2097 713/189 |
| 2006/0053305 | A1* | 3/2006 | Wahlert | G06F 11/1464 713/189 |
| 2006/0069865 | A1* | 3/2006 | Kawamura | G06F 11/2064 711/114 |
| 2006/0200638 | A1* | 9/2006 | Galipeau | G06F 16/178 711/162 |
| 2010/0114841 | A1* | 5/2010 | Holenstein | G06F 16/217 707/690 |
| 2013/0173537 | A1* | 7/2013 | Wilkinson | G06F 11/1471 707/611 |
| 2013/0198477 | A1* | 8/2013 | Wilkinson | G06F 11/2064 711/167 |
| 2016/0378473 | A1* | 12/2016 | Doshi | G06F 12/1045 712/208 |

* cited by examiner

SYSTEMS AND METHODS FOR MANAGING REPLICATION OF DATA TO A REMOTE STORAGE DEVICE

CROSS REFERENCE TO RELATED APPLICATION

This application is a continuation of U.S. patent application Ser. No. 15/719,490, titled "SYSTEMS AND METHODS FOR MANAGING REPLICATION OF DATA TO A REMOTE STORAGE DEVICE", filed Sep. 28, 2017, which application claims the benefit of Indian Patent Application No. 201721027617, titled "HIGHLY AVAILABLE AND EFFICIENT CLOUD-BASED REPLICATION TECHNIQUES FOR RECOVERY AS A SERVICE PRODUCTS", filed Aug. 3, 2017 the disclosure of which is incorporated, in its entirety, by reference.

BACKGROUND

Conventional cloud-based disaster recovery products may require high availability of all network components between a computer being replicated and a remote storage device. Failure of any constituent component of the network may require completely resynchronizing all replication data, which wastes resources such as time, network bandwidth, processor cycles, and energy. The instant disclosure, therefore, identifies and addresses a need for systems and methods for managing replication of data to a remote storage device.

SUMMARY

As will be described in greater detail herein, the instant disclosure describes various systems and methods for managing replication of data to a remote storage device. In one example, a system for managing replication of data to a remote storage device may include several modules stored in memory, including (1) a maintaining module, stored in the memory device, that maintains, on the computing device, a first bitmap storing data acknowledging persistence of source data at a source gateway, and a second bitmap storing data acknowledging persistence of target data at a target gateway, where the target gateway serves the remote storage device, (2) a sending module, stored in the memory device, that sends replication data from the computing device to the source gateway, (3) a setting module, stored in the memory device, that sets a bit in the first bitmap, where the set bit corresponds to the replication data sent to the source gateway, (4) a first receiving module, stored in the memory device, that receives a first acknowledgement, where the first acknowledgement indicates the source gateway received the replication data, (5) a copying module, stored in the memory device, that copies, in response to the first acknowledgement, the bit to the second bitmap, (6) a first clearing module, stored in the memory device, that clears, in response to the first acknowledgement, the bit in the first bitmap, (7) a second receiving module, stored in the memory device, that receives a second acknowledgement, wherein the second acknowledgement indicates the target gateway received the replication data, (8) a second clearing module, stored in the memory device, that clears, in response to the second acknowledgement, the bit in the second bitmap, and at least one physical processor that executes the maintaining module, the sending module, the setting module, the first receiving module, the copying module, the first clearing module, the second receiving module, and the second clearing module.

In one embodiment, a method for managing replication of data to a remote storage device may include (1) maintaining, on the computing device, a first bitmap storing data acknowledging persistence of source data at a source gateway, and a second bitmap storing data acknowledging persistence of target data at a target gateway, where the target gateway serves the remote storage device, (2) sending replication data from the computing device to the source gateway, (3) setting a bit in the first bitmap, where the set bit corresponds to the replication data sent to the source gateway, (4) receiving a first acknowledgement, where the first acknowledgement indicates the source gateway received the replication data, (5) copying, in response to the first acknowledgement, the bit to the second bitmap, (6) clearing, in response to the first acknowledgement, the bit in the first bitmap, (7) receiving a second acknowledgement, where the second acknowledgement indicates the target gateway received the replication data, and (8) clearing, in response to the second acknowledgement, the bit in the second bitmap.

In some examples, the method may include maintaining, on the computing device, (1) a third bitmap storing data acknowledging persistence of source data at the source gateway, and (2) a fourth bitmap storing data acknowledging persistence of target data at the target gateway.

In further examples, the method may include (1) switching from using the first bitmap to using the third bitmap when a threshold value of persistence of source data in the first bitmap is reached, (2) sending a marker to the source gateway when bits are previously set in the first bitmap at the time of switching, (3) receiving, from the source gateway, an acknowledgement that all data represented in the first bitmap is received, and (4) transferring all bits in the first bitmap to the second bitmap or the fourth bitmap.

In some examples, the method may include (1) switching from using the third bitmap to using the first bitmap when a threshold value of persistence of source data in the third bitmap is reached, (2) sending a marker to the source gateway when bits are previously set in the third bitmap at the time of switching, (3) receiving, from the source gateway, an acknowledgement that all data represented in the third bitmap is received, and (4) transferring all bits in the third bitmap to the second bitmap or the fourth bitmap.

In further examples, the method may include (1) switching from using the second bitmap to using the fourth second bitmap when a threshold value of persistence of target data in the second bitmap is reached, (2) sending a marker to the target gateway when bits are previously set in the second bitmap at the time of switching, (3) receiving, from the target gateway, an acknowledgement that all data represented in the second bitmap is received, and (4) clearing the second bitmap.

In some examples, the method may include (1) switching from using the fourth bitmap to using the second bitmap when a threshold value of persistence of target data in the fourth bitmap is reached, (2) sending a marker to the target gateway when bits are previously set in the fourth bitmap at the time of switching, (3) receiving, from the target gateway, an acknowledgement that all data represented in the fourth bitmap is received, and (4) clearing the fourth bitmap.

Moreover, the method may include (1) receiving an indication that a transient failure of a device in a replication path is repaired, and (2) resending to the source gateway, in response to the indication and when the bit is set in the first bitmap or the third bitmap, replication data corresponding to the bit.

In further examples, the method may include (1) receiving an indication that a fault of a first device in a replication path is repaired by replacement with a second device having no previous state or a new gateway provisioned similarly to the first device, and (2) resending to the target gateway, in response to the indication and when the bit is set in the second bitmap or the fourth bitmap, replication data corresponding to the bit.

In some examples, the method may include (1) receiving an indication that the source gateway or the target gateway is being provisioned, and (2) performing at least one security action in response to receiving the indication.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain, on the computing device, a first bitmap storing data acknowledging persistence of source data at a source gateway, and a second bitmap storing data acknowledging persistence of target data at a target gateway, where the target gateway serves the remote storage device, (2) send replication data from the computing device to the source gateway, (3) set a bit in the first bitmap, where the set bit corresponds to the replication data sent to the source gateway, (4) receiving a first acknowledgement, where the first acknowledgement indicates the source gateway received the replication data, (5) copy, in response to the first acknowledgement, the bit to the second bitmap, (6) clear, in response to the first acknowledgement, the bit in the first bitmap, (7) receive a second acknowledgement, where the second acknowledgement indicates the target gateway received the replication data, and (8) clear, in response to the second acknowledgement, the bit in the second bitmap.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing replication of data to a remote storage device.

As will be described in greater detail herein, the instant disclosure generally describes various resilient and efficient cloud-based replication techniques for recovery as a service (RaaS) products. As detailed herein, the disclosed systems may utilize a multiple bitmap approach. A replication data manager at an application node may use multiple bitmaps to store up-to-date information detailing which specific replication data is acknowledged as persisting on a source gateway and which specific replication data is acknowledged as persisting on a target gateway. Thus, when an equipment failure occurs in a replication path, the bitmaps provide an accurate record identifying which replication data is persisting on which gateways along the replication path. This record may be used to limit an amount of replication data required to be sent to resynchronize the replication. Also provided is a push model to clear bitmaps.

In this manner, the systems and methods described herein may improve recovery point objective (RPO) time and reduce application quiesce time, which leads to greater efficiency and resiliency. The systems and methods described herein also limit an amount of replication data required to be sent to resynchronize a replication and thus a full synchronization may not be required, which also leads to greater efficiency and resiliency. In addition, these systems and methods may save power, time, processing-related expenses, or a combination thereof.

Figure 1:
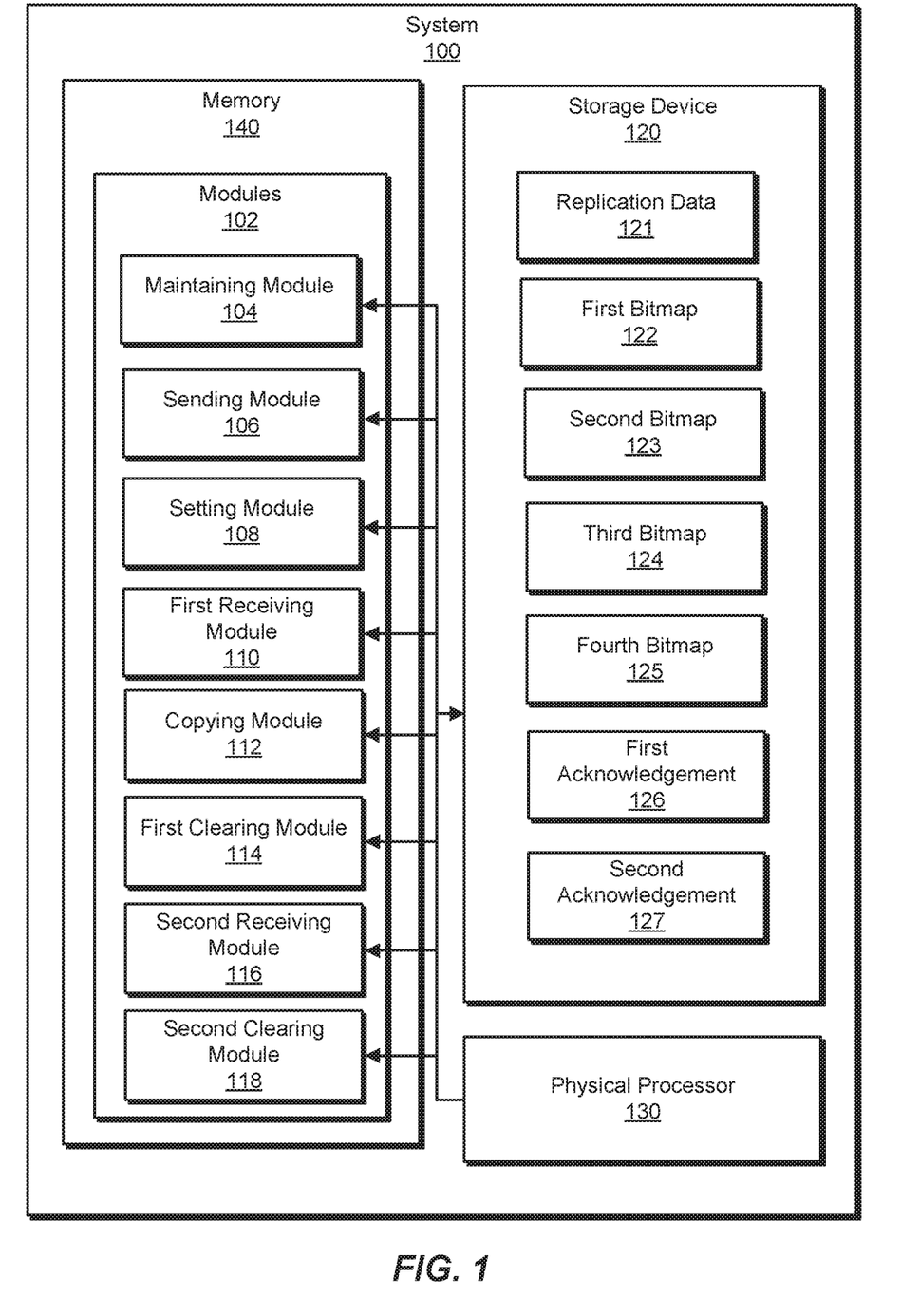
FIG. 1 is a block diagram of an example system for managing replication of data to a remote storage device.
Figure 2:
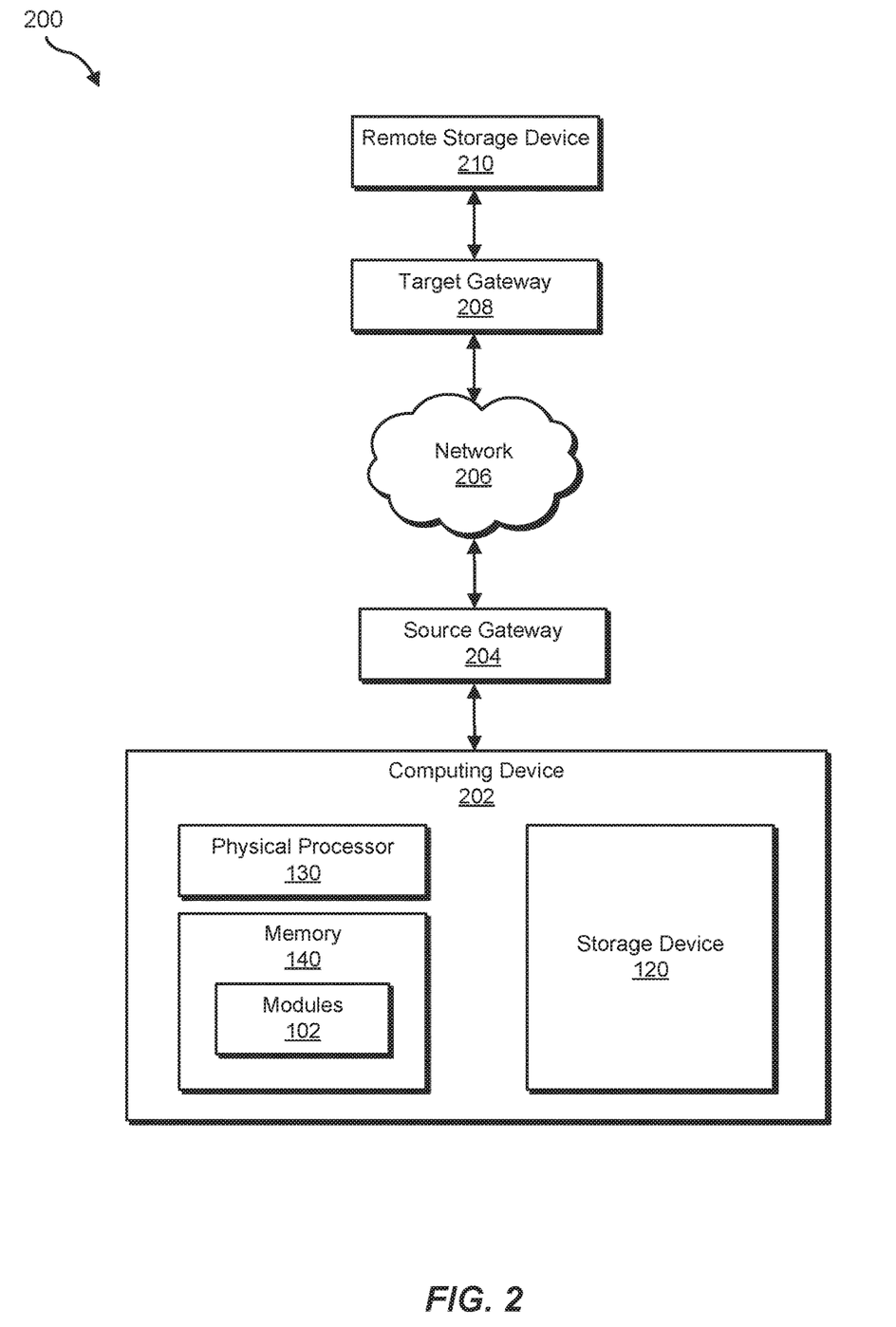
FIG. 2 is a block diagram of an additional example system for managing replication of data to a remote storage device.

The following will provide, with reference to FIGS. 1-2, detailed descriptions of example systems for managing replication of data to a remote storage device. Detailed descriptions of corresponding computer-implemented methods will also be provided in connection with FIG. 3.

FIG. 1 is a block diagram of an example system 100 for managing replication of data to a remote storage device. In examples, replication may include continuous replication. As illustrated in this figure, example system 100 may include one or more modules 102 for performing one or more tasks. As will be explained in greater detail herein, modules 102 may include a maintaining module 104, a sending module 106, a setting module 108, a first receiving module 110, a copying module 112, a first clearing module 114, a second receiving module 116, and a second clearing module 118. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail herein, one or more of modules 102 may represent modules stored and configured to run on one or more computing devices, such as computing device 202 illustrated in FIG. 2. One or more of modules 102 in FIG. 1 may also represent all or portions of one or more special-purpose computers configured to perform one or more tasks.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing replication of data to a remote storage device. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of replication data 121, first bitmap 122, second bitmap 123, third bitmap 124, fourth bitmap 125, first acknowledgement 126, and/or second acknowledgement 127. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As used herein, the term "bitmap" may refer to a technique for storing data describing a status of replication data sent from an application node to a gateway, such as a source gateway and/or a target gateway. A bit and/or combination of bits in a bitmap may be associated with specific replication data. A bitmap may be associated with replication data sent to a specific gateway.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a source gateway 204, a network 206, a target gateway 208, and a remote storage device 210. In examples, devices coupling computing device 202 with remote storage device 210 constitute a replication path on which replication data is communicated. In one example, all or a portion of the functionality of modules 102 may be performed by computing device 202 and/or any other suitable computing system. In examples, replication components, such as constituent devices of example system 200, may be distributed over multiple systems and/or multiple disk staging devices. In some examples, replication components may be configured in a cascaded topology. As will be described in greater detail herein, one or more of modules 102 from FIG. 1 may, when executed by at least one processor of computing device 202, enable computing device 202 to manage replication of data to remote storage device 210. In examples, replication may include continuous replication.

Computing device 202 generally represents any type or form of computing device capable of reading computer-executable instructions. For example, computing device 202 may represent an endpoint device running client-side software, such as an application node. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, storage servers, database servers, application servers, and/or web servers configured to run certain software applications and/or provide various storage, database, and/or web services variations or combinations of one or more of the same, or any other suitable computing device.

Source gateway 204 generally represents any type or form of computing device capable of connecting a local area network (LAN) to a different network (e.g., the Internet). In examples, source gateway 204 may filter or route data. In examples, source gateway 204 may include a storage device for caching data passing through source gateway 204. In some examples, source gateway 204 may couple computing device 202 to network 206, and thus to target gateway 206 and remote storage device 210.

Network 206 generally represents any medium or architecture capable of facilitating communication or data transfer. In one example, network 206 may facilitate communication between computing device 202 and remote storage device 210. In this example, network 206 may facilitate communication or data transfer using wireless and/or wired connections. Examples of network 206 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Target gateway 208 generally represents any type or form of computing device capable of connecting another LAN to different network (e.g., the Internet). In some examples, target gateway 208 may filter or route data. In examples, target gateway 208 may include a storage device for caching data passing through target gateway 208. In some examples, target gateway 208 may connect network 206 to remote storage device 210.

Remote storage device 210 generally represents any type or form of volatile or non-volatile storage device or medium capable of storing data and/or computer-readable instructions. In examples, remote storage device 210 may store replication data received from computing device 202. In examples, remote storage device 210 may be located remotely from computing device 202. Examples of remote storage device 210 include, without limitation, Random Access Memory (RAM), Read Only Memory (ROM), flash memory, Hard Disk Drives (HDDs), Solid-State Drives (SSDs), optical disk drives, caches, cloud-based storage devices, storage servers, database servers, application servers, and/or web servers configured to run certain software applications and/or provide various storage, database, and/or web services, variations or combinations of one or more of the same, and/or any other suitable storage memory.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced herein may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
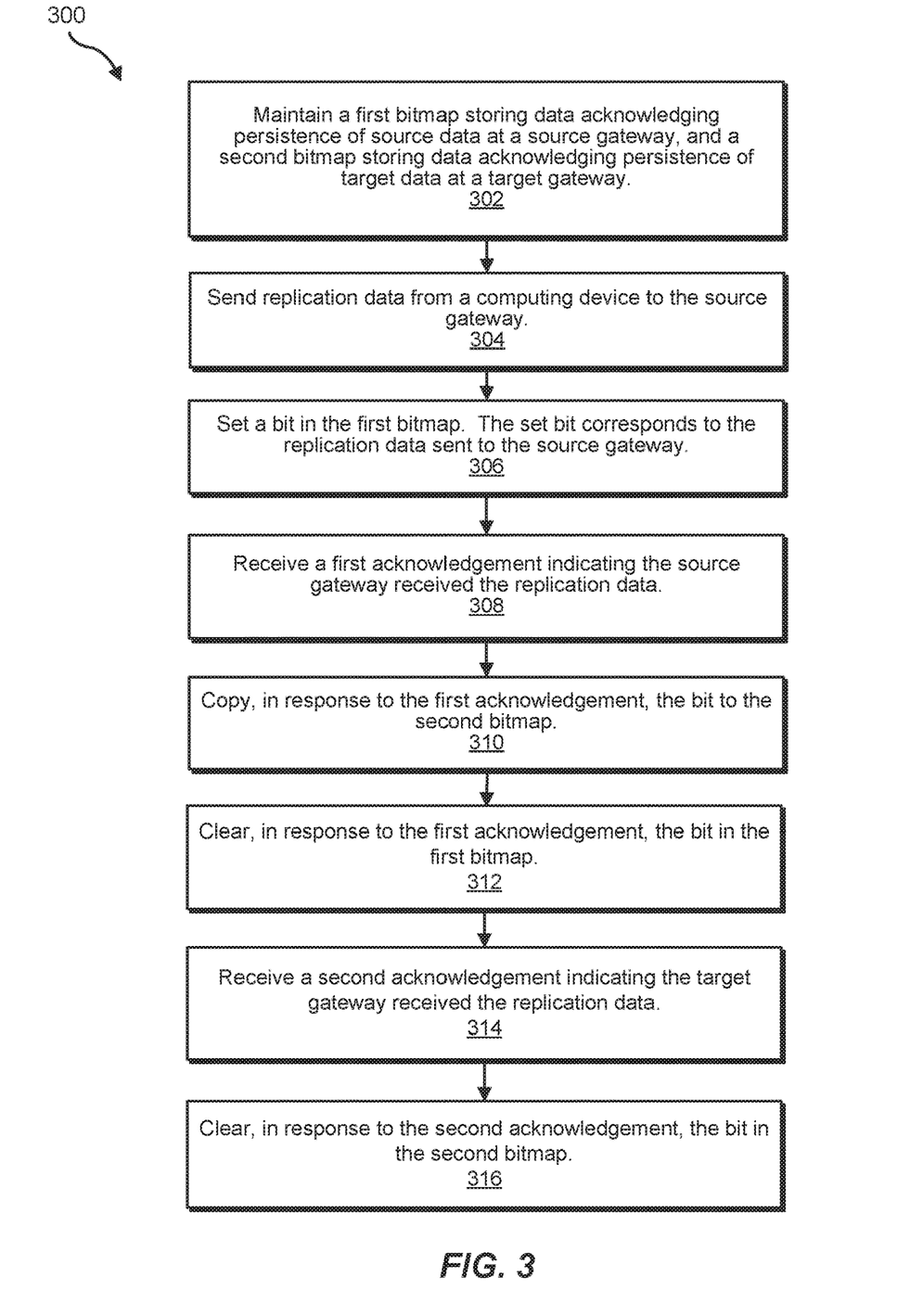
FIG. 3 is a flow diagram of an example method for managing replication of data to a remote storage device.

FIG. 3 is a flow diagram of an example computer-implemented method 300 for managing replication of data to a remote storage device. In examples, replication may include continuous replication. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail herein.

As illustrated in FIG. 3, at step 302 one or more of the systems described herein may maintain a first bitmap storing data acknowledging persistence of source data at a source gateway, and a second bitmap storing data acknowledging persistence of target data at a target gateway. In examples, the target gateway serves the remote storage device. For example, maintaining module 104 may, as part of computing device 202 in FIG. 2, maintain first bitmap 122 storing data acknowledging persistence of source data at source gateway 204, and maintain second bitmap 123 storing data acknowledging persistence of target data at target gateway 208.

In examples, one or more of the systems described herein may maintain a third bitmap storing data acknowledging persistence of source data at the source gateway, and a fourth bitmap storing data acknowledging persistence of target data at the target gateway. Providing these additional bitmaps can add resiliency by enabling cleaning one bitmap while another bitmap actively monitors the replication process.

As illustrated in FIG. 3, at step 304 one or more of the systems described herein may send replication data (e.g., an I/O) from the computing device to the source gateway. For example, sending module 106 may, as part of computing device 202 in FIG. 2, send replication data 121 from computing device 202 to source gateway 204.

As illustrated in FIG. 3, at step 306 one or more of the systems described herein may set a bit in the first bitmap. In some examples, the set bit corresponds to the replication data sent to the source gateway. For example, setting module 108 may, as part of computing device 202 in FIG. 2, set a bit in first bitmap 122. In examples, an IOTAP module may monitor replication traffic outbound from computing device 202 and accordingly set bits in bitmaps.

As illustrated in FIG. 3, at step 308 one or more of the systems described herein may receive a first acknowledgement. In some examples, the first acknowledgement indicates the source gateway received the replication data. For example, first receiving module 110 may, as part of computing device 202 in FIG. 2, receive first acknowledgement 126.

As illustrated in FIG. 3, at step 310 one or more of the systems described herein may copy, in response to the first acknowledgement, the bit to the second bitmap. For example, copying module 112 may, as part of computing device 202 in FIG. 2, copy, in response to first acknowledgement 126, the bit to second bitmap 123.

As illustrated in FIG. 3, at step 312 one or more of the systems described herein may clear, in response to the first acknowledgement, the bit in the first bitmap. For example, first clearing module 114 may, as part of computing device 202 in FIG. 2, clear, in response to first acknowledgement 126, the bit in first bitmap 122.

As illustrated in FIG. 3, at step 314 one or more of the systems described herein may receive a second acknowledgement. In some examples, the second acknowledgement indicates the target gateway received the replication data. For example, second receiving module 116 may, as part of computing device 202 in FIG. 2, receive second acknowledgement 127.

As illustrated in FIG. 3, at step 316 one or more of the systems described herein may clear, in response to the second acknowledgement, the bit in the second bitmap. For example, second clearing module 118 may, as part of computing device 202 in FIG. 2, clear, in response to second acknowledgement 127, the bit in second bitmap 123.

In examples, active operations may be switched between bitmaps to enable cleaning (i.e., clearing) bits from bitmaps. This operation may happen in a non-quiesced window, thus there may not be any impact on application performance. In examples, switching between like bitmaps (e.g., between two bitmaps monitoring a source gateway) may occur in response to a quantity of data in a bitmap exceeding a threshold value of persistence. In some examples, the threshold value of persistence is configurable. In examples, cleaning bitmaps may be performed using a push model in which a marker is inserted in a replication stream and the marker is acknowledged by a target device (e.g., a respective gateway) only after preceding replication data in the replication stream has been applied to the target device. In examples, a switching period between bitmaps monitoring a target gateway may be determined by round-trip time of a marker and a respective acknowledgement, as well as recovery point objective (RPO) time. Transferring bits between dissimilar bitmaps (e.g., from a bitmap monitoring a source gateway to a bitmap monitoring a target gateway) may occur in response to receiving an acknowledgement that all data in an off-line bitmap has been received by a respective gateway. An IOTAP module may manage the switching.

In examples, one or more of the systems described herein may switch from using first bitmap 122 to using third bitmap 124 when a threshold value of persistence of source data in first bitmap 122 is reached. In examples, a marker (e.g., a universally unique identifier) may be sent to source gateway 204 when bits are previously set in first bitmap 122 at the time of switching. In examples, an acknowledgement that all data represented in first bitmap 122 is received by source gateway 204 may be received from source gateway 204.

Further, all bits in first bitmap 122 may be transferred to second bitmap 123 or fourth bitmap 125.

In some examples, one or more of the systems described herein may switch from using third bitmap 124 to using first bitmap 122 when a threshold value of persistence of source data in third bitmap 124 is reached. In examples, a marker may be sent to source gateway 204 when bits are previously set in third bitmap 124 at the time of switching. In examples, an acknowledgement that all data represented in third bitmap 124 is received by source gateway 204 may be received from source gateway 204. Further, all bits in third bitmap 124 may be transferred to second bitmap 123 or fourth bitmap 125.

In examples, one or more of the systems described herein may switch from using second bitmap 123 to using fourth bitmap 125 when a threshold value of persistence of target data in second bitmap 123 is reached. A marker may be sent to target gateway 208 when bits are previously set in second bitmap 123 at the time of switching. In examples, an acknowledgement that all data represented in second bitmap 123 is received by target gateway 208 may be received from target gateway 208. Further, second bitmap 123 may be cleared.

In examples, one or more of the systems described herein may switch from using fourth bitmap 125 to using second bitmap 122 when a threshold value of persistence of target data in fourth bitmap 125 is reached. A marker may be sent to target gateway 204 when bits are previously set in fourth bitmap 125 at the time of switching. In examples, an acknowledgement that all data represented in fourth bitmap 125 is received by target gateway 208 may be received from target gateway 208. Further, fourth bitmap 125 may be cleared.

In examples, one or more of the systems described herein may receive an indication that a transient failure of a device in a replication path is repaired. In examples, transient failures may include a reboot of a gateway and/or a temporary loss of a network device in the replication path. In some examples, transient failures may not a have a loss of state in intermediate components in the replication path. In response to the indication and when the bit is set in first bitmap 122 or third bitmap 124, replication data corresponding to the bit may be resent to source gateway 204. The amount of data to be resent may be quite low compared to a full resynchronization.

In examples, one or more of the systems described herein may receive an indication that a permanent fault of a device in the replication path is repaired. In some examples, permanent failures have a loss of state in a component in the replication path. In examples, repair may be by replacement with another device having no previous state or a new gateway provisioned similarly to the faulted device. Repair may include replacement and/or reprovisioning (e.g., rebuilt with a zero state) of a failed device in the replication path, such as source gateway 204, target gateway 208, and/or a network device. In response to the indication and when the bit is set in second bitmap 123 or fourth bitmap 125, replication data corresponding to the bit may be resent to target gateway 208. The amount of data to be resent may be low compared to a full resynchronization.

In some examples, a potential security risk associated with the process may be identified in response to receiving an indication that the source gateway or the target gateway is being provisioned, and, in response to identifying the potential security risk, a security action may be performed in an attempt to ameliorate the potential security risk. For example, first receiving module 110 may identify a potential security risk associated receiving an indication that source gateway 204 or target gateway 208 is being provisioned. First receiving module 110 may in response perform a security action in an attempt to ameliorate the potential security risk. The security action may include stopping computer-implemented method 300. The security action may also include notifying computing device 202 of the potential security risk associated with source gateway 204 or target gateway 208 being provisioned.

In examples, in place of bitmaps described herein, data acknowledging persistence of source data at a source gateway, as well as data acknowledging persistence of target data at a target gateway, may be stored in a device that records writes and/or dirty blocks. In these examples, the bits described herein are included in the data acknowledging persistence of source data at the source gateway, as well as the data acknowledging persistence of target data at the target gateway.

In examples, in place of bitmaps described herein, data acknowledging persistence of source data at a source gateway, as well as data acknowledging persistence of target data at a target gateway, may be stored in a device that records a data log, such as a Storage Replicator Log (SRL) (e.g., in a VERITAS Volume Replicator (VVR)). In these examples, the bits described herein are included in the data acknowledging persistence of source data at the source gateway, as well as the data acknowledging persistence of target data at the target gateway.

As explained herein, the disclosed systems and methods may manage replication of data to a remote storage device with greater efficiency and resiliency than conventional techniques. The systems described herein may advantageously minimize a recovery point objective (RPO) time during a failure of a source gateway or a target gateway by minimizing an amount of replication data to be resent to a remote storage device post-failure. The systems described herein may advantageously minimize a quiesce window to time required to switch between bitmaps. In examples, the systems described herein may advantageously reduce a need to iterate over a network queue to set dirty region log bits to monitor a data replication process. In examples, the systems described herein may advantageously minimize resources necessary to manage replication of data by minimizing an amount of bitmap data to be maintained during the management process.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing replication of data to a remote storage device, at least a portion of the method being performed by a computing device comprising at least one processor, the method comprising:
   maintaining, on the computing device:
      a first bitmap storing data acknowledging persistence of source data at a source gateway; and
      a second bitmap storing data acknowledging persistence of target data at a target gateway, wherein:
      the target gateway serves the remote storage device; and
      the target gateway and the remote storage device are separate devices;
   sending replication data in a replication stream from the computing device to the source gateway;
   inserting a marker into the replication stream;
   receiving, from the target gateway, a first acknowledgement of receipt of the marker after the replication data in the replication stream has been applied to the target device; and
   clearing, in response to receiving the first acknowledgement of receipt of the marker, the first bitmap or the second bitmap.

2. The method of claim 1, further comprising:
   maintaining, on the computing device, a third bitmap storing data acknowledging persistence of source data at the source gateway;
   switching from using the first bitmap to using the third bitmap prior to clearing the first bitmap; and
   clearing the first bitmap.

3. The method of claim 2, wherein an in/out tap (IOTAP) module manages the switching.

4. The method of claim 1, further comprising:
   maintaining, on the computing device, a third bitmap storing data acknowledging persistence of target data at a target gateway;
   switching from using the second bitmap to using the third bitmap prior to clearing the second bitmap; and
   clearing the second bitmap.

5. The method of claim 1, further comprising:
maintaining, on the computing device, a third bitmap storing data acknowledging persistence of source data at the source gateway;
switching from using the third bitmap to using the first bitmap prior to clearing the third bitmap; and
clearing the third bitmap.

6. The method of claim 1, further comprising:
maintaining, on the computing device, a third bitmap storing data acknowledging persistence of target data at a target gateway;
switching from using the third bitmap to using the second bitmap prior to clearing the third bitmap; and
clearing the third bitmap.

7. The method of claim 1, further comprising determining a round-trip time of the marker and the first acknowledgement to identify a switching period between the first bitmap and the second bitmap.

8. The method of claim 7, wherein the switching period is further determined by a recovery point objective time.

9. The method of claim 1, further comprising:
receiving a second acknowledgement that all data in an off-line bitmap has been received by a respective gateway; and
transferring, in response to receiving the second acknowledgement, bits from the first bitmap to the second bitmap.

10. A system for managing replication of data to a remote storage device, the system comprising:
a memory device;
a maintaining module, stored in the memory device, that maintains, in the system:
a first bitmap storing data acknowledging persistence of source data at a source gateway; and
a second bitmap storing data acknowledging persistence of target data at a target gateway, wherein the target gateway serves the remote storage device,
wherein the target gateway and the remote storage device are separate devices;
a sending module, stored in the memory device, that:
sends replication data in a replication stream from the system to the source gateway; and
inserts a marker into the replication stream;
a receiving module, stored in the memory device, that receives a first acknowledgement from the target gateway, wherein the first acknowledgement acknowledges receipt of the marker after the replication data in the replication stream has been applied to the target device;
a clearing module, stored in the memory device and that clears, in response to receiving the first acknowledgement of receipt of the marker, the first bitmap or the second bitmap; and
at least one physical processor that executes the maintaining module, the receiving module, and the clearing module.

11. The system of claim 10, wherein:
the maintaining module maintains a third bitmap storing data acknowledging persistence of source data at the source gateway;
the system is configured to switch from using the first bitmap to using the third bitmap prior to clearing the first bitmap; and
the clearing module clears the first bitmap.

12. The system of claim 11, further comprising an in/out tap (IOTAP) module, stored in the memory device, that manages the switching.

13. The system of claim 10, wherein:
the maintaining module maintains a third bitmap storing data acknowledging persistence of target data at a target gateway;
the system is configured to switch from using the second bitmap to using the third bitmap prior to clearing the second bitmap; and
the clearing module clears the second bitmap.

14. The system of claim 10, wherein:
the maintaining module maintains a third bitmap storing data acknowledging persistence of source data at the source gateway;
the system is configured to switch from using the third bitmap to using the first bitmap prior to clearing the third bitmap; and
the clearing module clears the third bitmap.

15. The system of claim 10, wherein:
the maintaining module maintains a third bitmap storing data acknowledging persistence of target data at a target gateway;
the system is configured to switch from using the third bitmap to using the second bitmap prior to clearing the third bitmap; and
the clearing module clears the third bitmap.

16. The system of claim 10, wherein the sending module determines a round-trip time of the marker and the first acknowledgement to identify a switching period between the first bitmap and the second bitmap.

17. The system of claim 16, wherein the sending module further determines switching period by a recovery point objective time.

18. The system of claim 10, wherein:
the receiving module receives a second acknowledgement indicating all data in an off-line bitmap has been received by a respective gateway; and
the maintaining module transfers, in response to receiving the second acknowledgement, bits from the first bitmap to the second bitmap.

19. A non-transitory computer-readable medium comprising one or more computer-executable instructions that, when executed by at least one processor of a computing device, cause the computing device to:
maintain a first bitmap storing data acknowledging persistence of source data at a source gateway;
maintain a second bitmap storing data acknowledging persistence of target data at a target gateway, wherein:
the target gateway serves the remote storage device; and
the target gateway and the remote storage device are separate devices;
send replication data in a replication stream from the computing device to the source gateway;
insert a marker into the replication stream;
receive, from the target gateway, a first acknowledgement of receipt of the marker after the replication data in the replication stream has been applied to the target device; and
clear, in response to receiving the first acknowledgement of receipt of the marker, the first bitmap or the second bitmap.

20. The non-transitory computer-readable medium of claim 19, further comprising one or more computer-executable instructions that, when executed by the at least one processor of the computing device, cause the computing device to:
maintain a third bitmap storing data acknowledging persistence of source data at the source gateway;

switch from using the first bitmap to using the third bitmap prior to clearing the first bitmap; and clear the first bitmap.

\* \* \* \* \*